United States Patent [19]
Weighart

[11] 3,733,891
[45] May 22, 1973

[54] GATING SYSTEMS USED WITH NONDESTRUCTIVE MATERIAL TESTERS AND THE LIKE

[75] Inventor: Frederick G. Weighart, Sunset Cove, Conn.

[73] Assignee: Automation Industries, Inc., Century City, Calif.

[22] Filed: May 6, 1971

[21] Appl. No.: 140,854

Related U.S. Application Data

[63] Continuation-in-part of Ser. No. 839,497, July 7, 1969, abandoned.

[52] U.S. Cl.................................................73/67.9
[51] Int. Cl..............................................G01n 29/04
[58] Field of Search........................................73/67.9

[56] References Cited
UNITED STATES PATENTS 3,213,676 10/1965 Makous..............................73/67.9
3,262,306 7/1966 Henry................................73/67.9

*Primary Examiner*—Richard C. Queisser
*Assistant Examiner*—Arthur E. Korkosz
*Attorney*—Dan R. Sadler

[57] ABSTRACT

Herein described is an ultrasonic nondestructive test system which includes gating apparatus for alternatively dis-playing a full return video and auxiliary information. A dis-play gate which is responsive to the receiver circuit transfers echo return signals to a display on a cathode ray tube. A flip-flop is responsive to a pulse generator which alternately energizes the display gate so that at one time a full video sig-nal is displayed and at alternate times auxiliary information is displayed.

10 Claims, 2 Drawing Figures

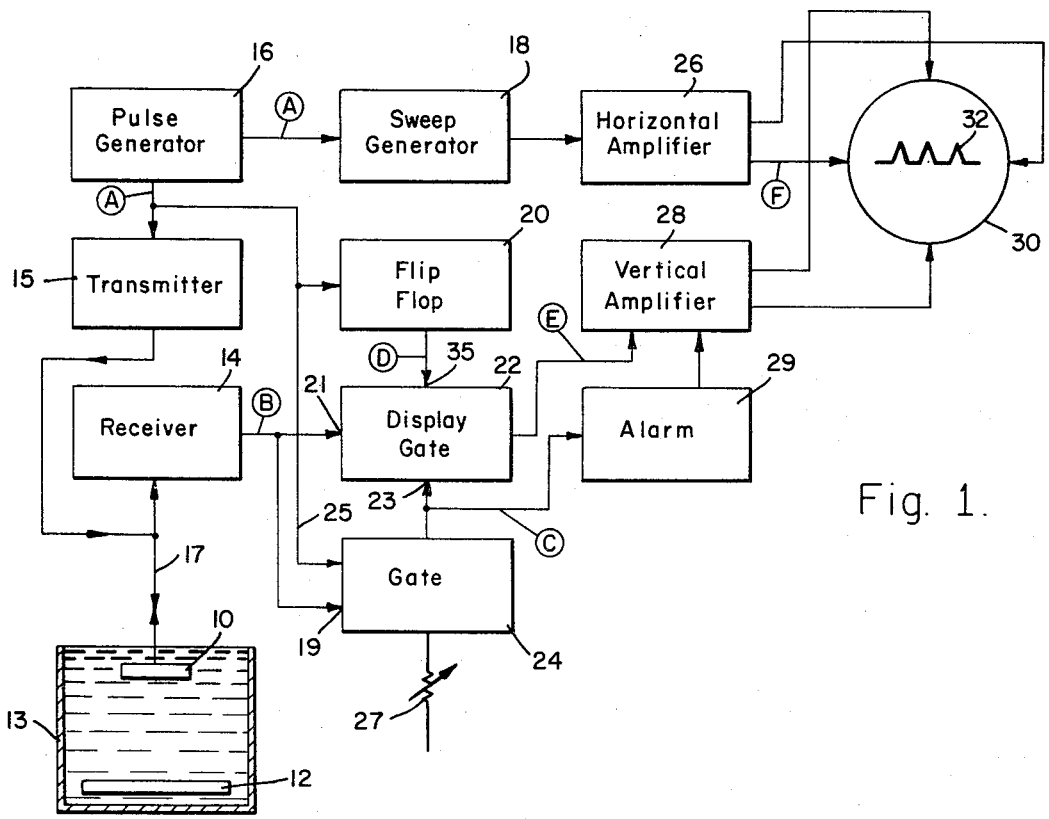
Fig. 1.
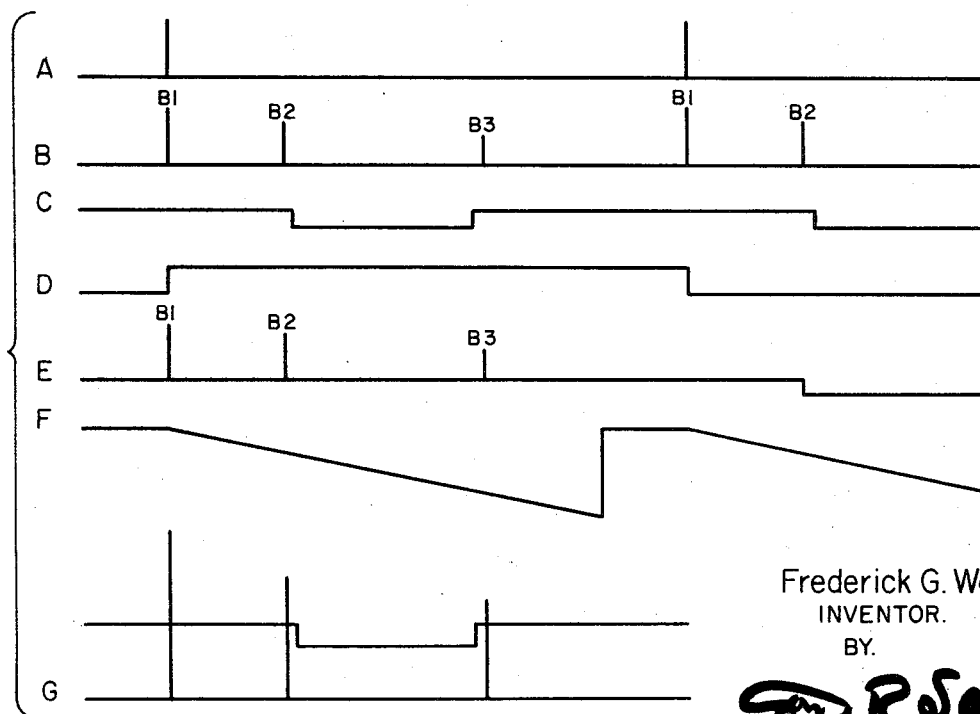
Fig. 2.
Frederick G. Weighart,
INVENTOR.
BY.
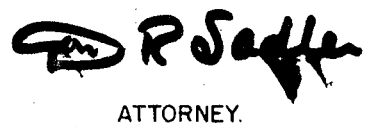
ATTORNEY.

GATING SYSTEMS USED WITH NONDESTRUCTIVE MATERIAL TESTERS AND THE LIKE

CROSS-REFERENCE

This application is a continuation of United States application, Ser. No. 839,497, filed July 7, 1969 now abandoned.

BACKGROUND

This invention relates to nondestructive ultrasonic material testers and more particularly to electronic circuitry in combination therewith for displaying alternating traces on a display system or the like.

Electrical nondestructive test equipment is used to test workpieces for flaws, defects and other discontinuities as well as measure thickness thereof. These systems generate ultrasonic energy within a search unit which usually include a transducer such as a piezoelectric crystal. The ultrasonic energy from the transducer is sent in the form of an acoustical pulse beam or a burst of acoustical pulses toward the workpiece into the area being tested. The beam travels unimpeded through the workpiece and reflects back from the front and back end surfaces thereof. Any flaw, defect or other discontinuity in the workpiece also causes reflections of the acoustical beam back to the transducer. The transducer then transforms the acoustical energy into corresponding electrical signals. The resultant electrical signal from the transducer is applied to the test instrument which indicates the location and size of the discontinuity or defect on a display such as a cathode ray tube.

In operation the pulse of high frequency ultrasonic energy is projected from the search unit into the workpiece. A portion of the projected energy is reflected back by the flaw or defect. Further portions of the projected energy are reflected from the front and back surfaces of the workpiece. The return energy is received by the search unit and converted to the corresponding electrical energy and thereafter amplified and displayed on the screen of the cathode ray tube. The screen on the cathode ray tube displays the received energy as spikes corresponding to the initial pulse, the front surface and the back surface. If there are any defects, there is a spike between the spikes representing the front and back surfaces. Spacing of the spikes on the scope is in proportion to the distance the beam travels from the transducer through the workpiece. For example, the distance between the first pulse and the next pulse generally is the distance between the transducer surface and the workpiece and generally contains no useful information. The distance between the second pulse and the last pulse is thickness of the workpiece. It is within these latter two pulses that useful information is generally located.

Oftentimes it becomes desirable to pass only certain portions of the return energy. These certain portions are sometimes referred to as the gated area. Therefore, electrical circuitry can be used to only pass signals in the desired areas which is ideally defined as an area between the back and front surfaces of the workpiece represented on the display as the area between the second and last spikes. Thus, by use of this circuitry various unwanted signals, such as water couplant noise and the initial transmitted pulse, are suppressed and will not cause an alarm or other output. Signals which do appear in the gated area are usually indicative of a flaw or defect, and after passing through the gate they can be applied to alarms and recorders. Normally the gated area is displayed by displacing the video trace vertically with a step. This is not entirely satisfactory since a multitude of video signals can obscure the location of the gate. In some instances this has been avoided in the prior art by displaying the gate on an alternate trace, but this method has been limited to tests where the gate is set a fixed time from the initial pulse. In an immersed test it can be seen that any change of part geometry or alignment will result in a difference in time between initial pulse and first interface. The gate has therefore been synchronized to the interface to maintain a constant position with respect to the front surface. When thus synchronized, it has heretofore been impossible to display this gated area clearly on an alternate trace since there is no way to reproduce the variation of time between initial pulse and gate.

A need has arisen for a nondestructive material tester which includes means for displaying the full video signal on one pulse and the gated area on the next pulse from the transmitter, so that the signal can be continuously synchronized with the interface to obtain a certain degree of accuracy in defect location. The display is alternately switched from full video output to alternate display information on every other pulse period. The full video display will occur at half the actual pulse rate, but other gating and recording functions will occur at the full pulse rate. In addition to displaying the gated area, it is also possible to display time markers, distance amplitude correction curves, alarm level, and other auxiliary information which is synchronized to interface. These types of results could heretofore only be attained with a dual gun cathode ray tube which is quite expensive.

SUMMARY

Briefly described, the disclosed embodiment of the present invention includes a pulse generator adapted to provide a train of pulses to a transmitter which transmits electrical pulses to a search unit. The search unit is adapted to be acoustically coupled to a workpiece and be the type which includes a transducer adapted to transmit corresponding ultrasonic energy into the workpiece and to receive reflected signals therefrom and transmit corresponding electrical signals to a receiver. A display means, such as a cathode ray tube, displays the reflected echo signals. A display gate is coupled between the receiver and the cathode ray tube and is operated by a bistable multivibrator, sometimes referred to herein as a flip-flop. An alternate gating circuitry has an input responsive to the pulse generator and is coupled between the receiver and an input of the display gate.

The display gate is operative in response to the flip-flop to alternately pass the full signal from the receiver and signal information from the alternate gating circuitry. Thus signal information from these two sources is alternately passed by the display gate to the display.

DRAWINGS

These and other features and advantages will become more apparent to those skilled in the art when taken into consideration with the following detailed description wherein like reference numerals indicate like and corresponding parts throughout the several views and wherein:

FIG. 1 is a block diagram of a preferred embodiment of this invention; and

FIG. 2 is a graph illustrating waveforms taken at various points throughout the system shown in FIG. 1.

DESCRIPTION

Turning now to the drawings there is shown a nondestructive test instrument which includes a search unit 10 having an ultrasonic transducer therein. The transducer within the search unit 10 could, for example, be comprised of a piezoelectric crystal element which vibrates in the thickness mode when excited by electrical pulses. The search unit 10 in this embodiment is shown placed in a water couplant inside of a tank 13 and which couples the transducer 10 to the workpiece 12. A transmitter 15 is coupled to the search unit 10 via the cable 17. Pulses emitted by the transmitter 15 excite the transducer in the search unit 10, causing it to vibrate in the thickness mode and emit a corresponding pulse of ultrasonic energy.

Ultrasonic echo pulses from the workpiece are received by the search unit 10 causing the transducer to vibrate and emit a corresponding electrical signal. This electrical signal is returned by the cable 17 to the receiver 14. The receiver 14 is coupled to one input 21 of a display gate 22 which in turn is coupled to a vertical deflection amplifier 28. The output from amplifier 28 in turn is coupled to the vertical deflection plates of a cathode ray tube 30. The transmitter 15 is operated by pulses (FIG. 2A) from a pulse generator 16. The pulse generator 16 also drives a sweep generator 18 which in turn is coupled to a horizontal amplifier 26. The horizontal amplifier 26 is coupled to provide sweep signals to the horizontal deflection plates of the cathode ray tube 30. These sweep signals are depicted as Graph F in FIG. 2.

The output signals of the receiver 14 and the horizontal deflection generator 26 are displayed as a trace 32 on the face of the cathode ray tube 30.

The signal from the receiver 14 is best seen in FIG. 2A and includes a series of spikes which repeatedly reoccur at the frequency of the clock pulses from the pulse generator 16. The first spike B1 corresponds to the "main bang" i.e., the driving or clock pulse of FIG. 2A. This is the signal which drives the search unit 10 and causes it to radiate a pulse of ultrasonic energy through the liquid couplant and toward the workpiece 12.

The second spike B2 corresponds to the echo of the ultrasonic energy reflected from the interface between the couplant and the workpiece 12. The time delay between spike B1 and spike B2 is a function of the length of the couplant between the search unit 10 and the workpiece 12.

The third spike B3 corresponds to the echo of the ultrasonic energy reflected from the backside of the workpiece 12. The time delay between spike B2 and spike B3 corresponds to the thickness of the workpiece.

Although they are not shown in the drawings, there may also be randomly occurring spikes, particularly between the second spike B2 and the third spike B3. These random spikes are indicative of reflective discontinuities within the workpiece 12 somewhere between the front and rear surfaces of the workpiece.

Spacing of the random spikes is in proportion to the depth of the discontinuity within the workpiece. Any random spike which appears between the initial spacing of the reflections from the front and back surfaces of the workpiece is indicative of flaws, defects or other discontinuities in the workpiece being tested. Thus, the location of these flaws is easily identifiable by the random spikes which appear between the front and back surface reflections B2 and B3. Therefore, the information which is of primary concern is that contained between the front reflection B2 and the back reflection B3. Therefore, in a manner hereinafter described, the information displayed on the screen of the cathode ray tube is primarily that which occurs between these two pulses.

A display gate 22 is provided which has a control input 35, a first signal input 21 and a second signal input 23. The control input 35 is coupled to a switching device, herein flip-flop 20, driven by the clock pulses (FIG. 2A) from the pulse generator 16. Each time a clock pulse occurs the flip-flop 20 will reverse itself whereby a square wave corresponding to FIG. 2D occurs. It will be seen that the square wave has a frequency that is one-half that of the clock pulses.

However, the switching device, here in the form of flip-flop 20, may be a counter whereby the square wave of FIG. 2D may have a frequency which is any other submultiple such as one-half, one-fourth, one-fifth, etc.

When the control input 35 is driven high by the flip-flop 20, the display gate 22 will pass the signal on the input 21 to the output. However, when the control input 21 is driven low by the flip-flop 20, the display gate 22 will pass the signal on the input 23 to the output. In other words, display gate 22 acts as a switch to alternately pass the received signal on the input 21 or the signal on the input 23.

In addition, an alternate information gate 24 may be provided. This gate may be of a type known as a Transigate manufactured and sold by the Sperry Products Division of Automation Industries, Inc., of Danbury, Connecticut. The gate 24 has a control input 25 coupled to the output of the pulse generator 16, a control input 19 coupled to the receiver 14 and an output coupled to the signal input 23 of the display gate 22.

The transigate 24 generates a gate signal similar to that shown in FIG. 2C. The gate signal is an inverted or step-down square wave. If a signal occurs on input 19 during the gate interval, it will be allowed to pass through to the alarm and cause operation of a light, relay or buzzer.

The length of the time interval is determined by the manual setting of the potentiometer 27. This potentiometer 27 is normally set to produce a time interval which is just shorter than the time between spike B2 and B3.

Referring to Graph A shown in FIG. 2, the original synchronous pulses applied to the sweep generator 18 generates a linear sweep ramp signal F. The horizontal amplifier 26 amplifies this signal and applies it to the horizontal deflection plates of the cathode ray tube 30, the initial pulse A from the pulse generator 16 is also applied to the flip-flop 20. The output of flip-flop 20 operates display gate 22 to alternately gate either the signals from the receiver 14 (FIG. 2B) or the signals from the gate 24 (FIG. 2C) through the display gate 22 to the vertical amplifier 28. Thus, the full video signals B and the gate signals C are alternately displayed on the cathode ray tube. That is, one time the C signals are displayed containing the useful information and on alternate times, the full signals B are shown on the display 30. By comparing the gate signal C with the B2 and B3 signals on generated marker signals or a graph overlay on the screen, synchronization of the gate signal to the interface signals can be accomplished.

Any flaw or defect which is in the workpiece 12 will occur some time during the gate signal C between the B2 pulse and B3 pulse shown in FIG. 2. Consequently, an alarm 29 is coupled to the output of gate 24 and generates an alarm signal when a spike appears with the gated signal C. This alarm may be in an audible form or the type which records the alarm as a mark on a paper record. The initial pulse B1 provided by the pulse generator 16 and also present from receiver 14 will not activate gate 24. The interface signal B2, on the other hand, will turn gate 24 ON and provide a gate signal C as shown in FIG. 2. This signal is ON for a predetermined duration as dictated by the control potentiometer 27. Generally this time is just less than the time between interface signals B2 and B3.

The gate signal C as shown in FIG. 2 is only displayed on tube 30 during alternate pulse periods from the pulse generator 16. During the intermediate pulse periods, the B signals from the receiver 14 are displayed.

The Graph G in FIG. 2 illustrates the display which will appear on the face of the cathode ray tube 30. The trace 36 representing square wave C is displaced vertically from the received signal as shown in FIG. 2G. The alarm 29 may be connected to the vertical amplifier 28 whereby the amount of vertical deflection is a function of the alarm level. The square wave (FIG. 2C) is started by the first interface signal B2 as applied to input 19. The potentiometer 27 is set so that square wave terminates just before the backside signal B3. As a result, the square wave display is always vertically aligned with front and back spikes in the received signal display.

If a flaw is present it will cause an echo to occur between the spikes B2 and B3. This will appear in the display of the received signal whereby it can be compared with the rest of the video signal.

However, it will also be coupled from the input 19 through the gate 24 to the alarm 29 and the input 23 of gate 22. As a consequence, the echo signal will be displayed in the gated square wave. Accordingly, the operator can visually observe the echo signal separate from the rest of the video signal.

It can be appreciated that although the display of the gated area is produced at a frequency which is a submultiple of the pulse repetition rate, the alarm 29 is still operative on each transmitted pulse. It should also be noted that additional information such as display time markers, distance ampliude correction curves, etc., may be displayed and correlated with the first interface signal.

Thus, there has been shown and described a system which is capable of displaying on alternate trace signals, the gate period during which a flaw signal may occur. The gate is always activated by the first interface signal. Therefore, any change in the relative distance between the search unit 10 and the workpiece 12 will directly affect the operation of gate 24. Thus, a different information is displayed on alternate traces, and during the gate signal display there is no confusion of signals, since the initial pulse signal and the front and back surface reflections do not appear.

Having thus described but one preferred embodiment of this invention, what is claimed is:

1. A nondestructive testing system for ultrasonic inspection of a workpiece including:
   a pulse generator adapted to provide a train of electrical pulses;
   a transmitter coupled to said pulse generator for receiving such train of electrical pulses;
   an ultrasonic search unit being adapted to be acoustically coupled to the workpiece and coupled to said transmitter for responding to transmitted electrical pulses of said train, said search unit being adapted to transmit ultrasonic pulses into the workpiece corresponding to said train of electrical pulses and to receive ultrasonic echo pulses from the workpiece and provide electrical pulses corresponding thereto;
   a receiver coupled to said search unit for receiving electrical pulses representing said ultrasonic echo pulses;
   a display means adapted to be coupled to said receiver for displaying the electrical pulses received by said receiver;
   auxiliary gate signal generating means coupled to said pulse generator and to said receiver for generating a gate signal corresponding to only a selected portion of the electrical pulses received by said receiver; and
   gating means for coupling said receiver and said auxiliary gate signal generating means to said display means, said gating means including means coupled to said pulse generator for alternately passing electrical pulse signals from said receiver and from said auxiliary gate generating means to said display means in response to certain preselected pulses from said pulse generator.

2. A gating circuit for an ultrasonic inspection system including:
   a pulse generator;
   an ultrasonic search unit connected and responsive to said pulse generator for transmitting ultrasonic pulses into a workpiece and for receiving ultrasonic echo signals from such workpiece to provide corresponding electrical echo signals;
   receiver means connected to said search unit for receiving said electrical echo signals;
   auxiliary gate means coupled to said pulse generator and to said receiver means and responsive to electrical pulse signals therefrom for generating a gated signal of a selected portion of electrical echo signals received by said receiver means;
   display means for displaying electrical echo signals, said display means including a sweep generator means coupled and synchronized to said pulse generator;
   gating means alternately coupling the electrical echo signals from said receiver means and the selected portion of electrical echo signals from said auxiliary gate means to said display means, said gating means including means connected to said pulse generator for providing said alternate coupling of said receiver means and said auxiliary gate means to said display means in response to said pulse generator.

3. The gating circuit of claim 2, wherein said gating means includes:

a display gate having a first input coupled to said receiver means and a second input coupled to said auxiliary gate means, said display gate further having an output coupled to said display means and a control input, and a switching device coupled between said pulse generator and the control input of said display gate to provide said means responsive to said pulse generator to alternately couple said receiver means and said auxiliary gate means to said display means in response to certain preselected pulses from said pulse generator.

4. The gating circuit of claim 3 wherein said switching device is a flip-flop and said display gate is responsive at its control input to said flip-flop to alternately couple said receiver means and said auxiliary gate means to said display means in response to the certain preselected pulses from said pulse generator.

5. The gating circuit of claim 3 wherein said switching device is a counter and said display gate is responsive at its control input to said counter to alternately couple said receiver means and said auxiliary gate means to said display means in response to the certain preselected pulses from said pulse generator.

6. An ultrasonic tester for testing a workpiece including:

a pulse generator for providing a train of pulses, a search unit coupled to said pulse generator for transmitting ultrasonic pulses into the workpiece and receiving ultrasonic echos therefrom to provide electrical pulse signals corresponding to such echos, receiver means coupled to said search unit for receiving electrical pulse signals corresponding to said ultrasonic echos, display means for receiving the electrical pulse signals from said receiver means, gating means coupled between said receiver means and said display means for selectively gating electrical signals received by said receiver means to and for display by said display means, switching means connected between said pulse generator and said gating means for providing said selective gating of said electrical signals from said receiver means to said display means in response to pulses issued by said pulse generator, and auxiliary gate means having inputs connected to said pulse generator and to said receiver means and having an output for coupling to said display means, said auxiliary gate means responsive to pulses from said pulse generator and electrical pulse signals from said receiver means for passing only preselected portions of said receiver means pulse signals to and for display by said display means.

7. A nondestructive tester system for ultrasonic inspection of a workpiece including:

a pulse generator constructed and arranged to provide a train of electrical pulses;

a transmitter coupled to said pulse generator and constructed and arranged to be responsive to said train of pulses from said pulse generator;

a search unit coupled to said transmitter and responsive thereto to transmit ultrasonic pulses into a workpiece under test and to receive ultrasonic echos returned from the workpiece;

a receiver coupled to said search unit and responsive to electrical signals caused by ultrasonic echos received by said search unit, said receiver being constructed and arranged to respond to at least an electrical pulse signal caused by a front workpiece surface echo from said search unit;

display means for displaying the electrical signals received by said receiver;

an auxiliary gate means having an input coupled to said pulse generator, an input coupled to said receiver and an output, said auxiliary gate means responsive to said train of pulses from said pulse generator and electrical pulse signals from said receiver to provide at said auxiliary gate means output an auxiliary gate signal in response to the reception of said front workpiece surface echo pulse signal from said receiver;

a display gate having a first input coupled to said receiver, a second input coupled to the output of said auxiliary gate means, and having an output coupled to said display means, said display gate having a control input responsive to a signal applied thereat to selectively alternately pass a signal from said receiver and a signal from said auxiliary gate means to said display means; and a switching device having a control input connected to said pulse generator and having an output connected to said control input of said display gate for causing said display gate to alternately pass said receiver and auxiliary gate means signals to said display means in response to preselected pulses from said pulse generator.

8. The tester system as defined in claim 7, further including alarm means coupled to the output of said auxiliary gate means.

9. A nondestructive testing system including:

a pulser means for providing electrical pulses;

a search unit coupled to said pulser means;

a receiver coupled to said search unit to receive electrical signals therefrom;

an auxiliary gate signal generator having a first input means coupled to said pulser means and a second input means coupled to said receiver for generating a gating signal in response to a predetermined sequence of signals from said pulser means and from said receiver;

display means for being coupled to said auxiliary gate signal generator and to said receiver for displaying electrical signals therefrom; and display gating means coupled to said receiver and to said auxiliary gate generator and to said display means for causing the signals from said receiver and from said auxiliary gate generator to be alternately displayed.

10. The system as defined in claim 9 wherein said gating means includes:

a display gate having a first input means coupled to said receiver and a second input means coupled to said auxiliary gate signal generator and an output means coupled to said display means; and a switching device having first and second states coupled to said pulser means and coupled to said display gate to alternately enable said display gate to pass signals from said receiver to said display means when in said first state and to enable said display gate to pass signals from said auxiliary gate signal generator to said display means when in said second state.

* * * * *